United States Patent Office 3,102,585
Patented Sept. 3, 1963

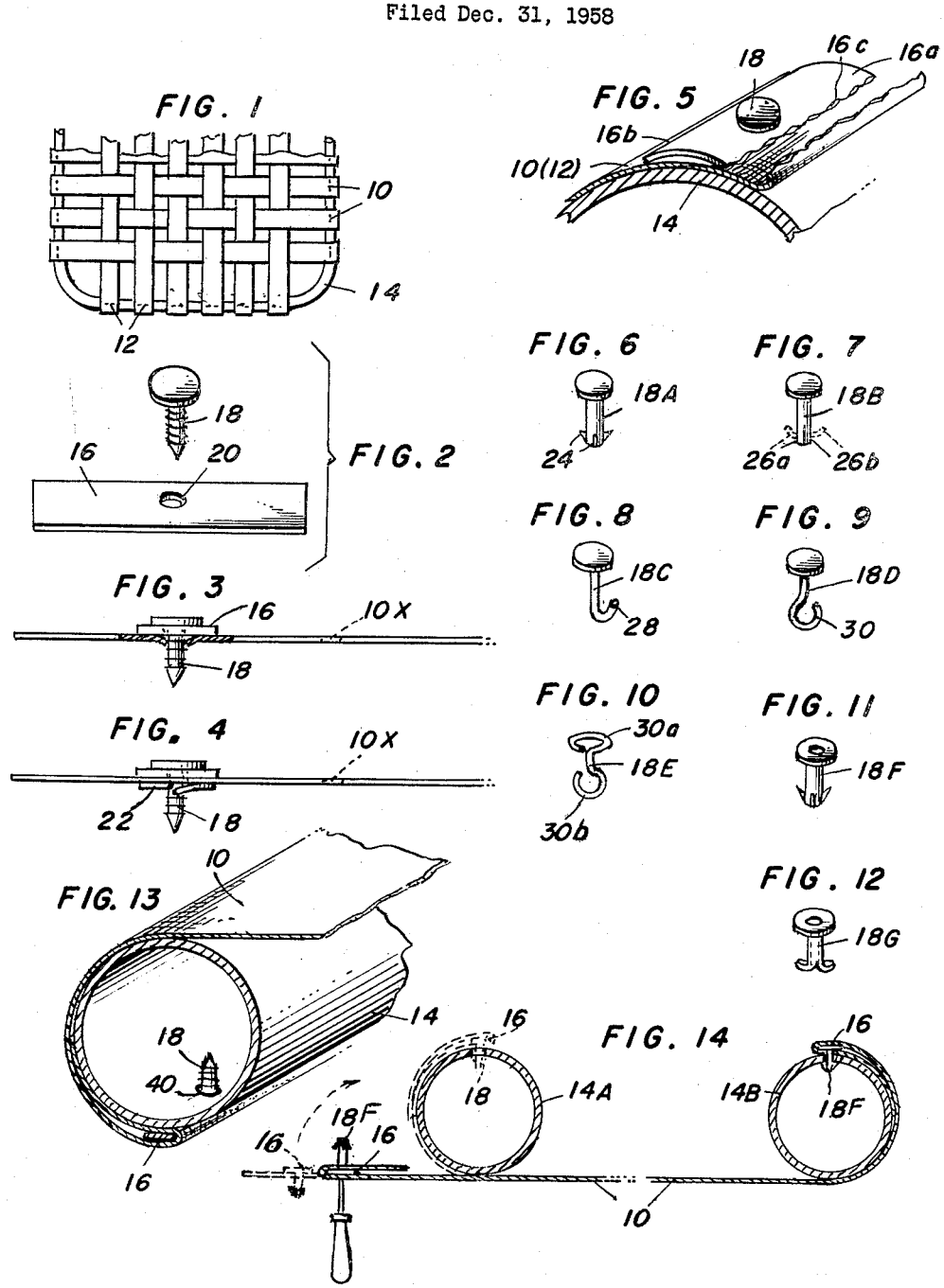

3,102,585
WEB-TO-TUBE FASTENINGS
Hyman Kramer, 2764 E. 16th St., Brooklyn 35, N.Y.
Filed Dec. 31, 1958, Ser. No. 784,186
6 Claims. (Cl. 160—404)

This invention relates to improvements in web-to-tube fastenings, and more particularly to an improved drive-type fastening for securing the ends of the fabric or plastic webbing strips now widely used in making up the seat and/or back elements of metal frame furniture to the tubular framing thereof and to an improved drive-type fastener for use in such a fastening.

Stated broadly, a principal object of the present invention is the provision of a webbing strip-to-tubing fastening making use of a fastener of inexpensive construction and characterized also by the ease and simplicity with which it may be preliminarily self-secured to a webbing-strip end and thereafter finally assembled to its tubing, which is not only competitive costwise with the prior fastenings serving similar function of which I am aware, but also is effective and thoroughly dependable in use.

Another object of the invention is the provision of a simple form of drive-type fastener for securing webbing strip ends to the tubular frame members of metal frame furniture, which is featured by rugged, inexpensive construction, ease in preliminarily assembling same to a webbing strip end which in turn enables a webbing strip with fastener applied to both ends thereof to be supplied to the person who or the machine which completes the fastener as a sub-assembly unit, and which can be set or driven home in its tubing opening by a simple fastener driving operation.

A further object of the invention is the provision of an improved two-part, T-shaped fastener for securing webbing strip ends to the tubing constituting the frame of metal frame furniture, characterized in that the two parts making up the fastener are either commercially available or can be inexpensively produced in quantity by existing automatic machinery.

Another object of the invention is the provision of a two-part drive-type fastener as aforesaid, the two parts of which are so constructed as to permit the assembly of said parts with one another and with the webbing strip end for which intended in an automatic machine operation, as enables webbing strips with fasteners attached to both ends thereof to be supplied to the operator who or machine which completes the fastening inexpensively and with a minimum of manual handling thereof.

Still another object of the invention is the provision of an improved T-shaped fastener as aforesaid wherein the drive part of the fastener is formed at least partially hollow and with its bore opening through the fastener head portion, thus to permit insertion of a leverage-applying tool point by which a webbing strip being fastened to a tubular frame member may be tensioned against the already fastened other end thereof and the fastener shank portion thereupon brought to a position in which it aligns with its tubing opening as facilitates the completion of the fastening.

Yet another object of the invention is the provision of an improved, simplified method of tensioning a webbing strip in course of being fastened at both its ends to two spaced tubular frame members against one end thereof which has already been fastened to its tubing, and thereupon of completing the fastening of the other or second end of the webbing strip to its tubing.

The above and other objects and features of advantage of the invention will appear from the following detailed description thereof taken with the accompanying illustrative drawings wherein:

FIG. 1 is a fragmentary view of a seat (or back) of a piece of tubular frame furniture fashioned from interlaced fabric or plastic webbing strips secured at their ends to the spaced tubular framing thereof as by a fastening as herein proposed;

FIG. 2 is a separated perspective view illustrating the parts of a simple two-part fastener for use in such a fastening;

FIG. 3 is a side edge view of a webbing-strip end portion to be secured, which illustrates a fastener according to the FIG. 2 form preliminarily assembled thereto whereby the strip and fasteners, one for each end thereof, may be supplied to the operator who or machine which completes the fastening as a subassembly unit;

FIG. 4 is a view similar to FIG. 3 but illustrating a more positive form of securement of fastener to webbing strip end than appears in FIG. 3;

FIG. 5 is a fragmentary perspective view illustrating a modified form of fastener-head part which provides some additional fastening action on the underlapping webbing strip end of a completed fastening, as compared to the FIG. 2 type of fastener head;

FIGS. 6–12 inclusive illustrate various forms of fastener drive parts which may be used in substitution of the nail-form drive part shown in FIGS. 2–4;

FIG. 13 is a sectional, broken-away perspective view of a completed fastener using the nail-type drive part according to either of the FIG. 3 or FIG. 4 forms; and FIG. 14 is a broken-away sectional view taken through two spaced tubular frame members and a webbing strip in the course of being secured thereto at both its ends, the view illustrating the method by which the webbing strip may be tensioned against an already secured end and the fastening of the other end thereof thereby completed, as made possible by the use of certain forms of fastener drive parts according to the invention.

Referring to the drawings, FIG. 1 generally illustrates conventional tubular metal frame furniture construction in which interlaced webbing strips 10, 12 of fabric or plastic making up the seat and/or back elements thereof are secured at both their ends to spaced tubular frame components, hereinafter for convenience called the tubing. The present invention is directed to an improved webbing strip end-to-tubing fastening, to an improved fastener for use therewith, and to a simplified method of completing at least one of the end fastenings of a webbing strip to its tubing, as will now be described.

Referring to FIG. 2 illustrating possibly the most simple yet a highly effective form of webbing strip-to-tubing fastener as herein proposed, such as is characterized by two-part construction and T-configuration and illustratively comprises a head or top part 16 in the form of an elongate bar or strap, and a drive part 18 adapted to be associated therewith by being forced through an opening 20 provided in the central portion of said top part which is slightly undersize relative to said drive part.

The aforesaid top part 16 may be fashioned from sheet metal, plastic or like material of suitable gauge providing same with the requisite stiffness; its length is substantially equal to the width of the webbing strips being secured; and its width, while not critical, is substantially greater than the diameter of the drive part and also such that it is not substantially weakened by punching or drilling of the drive-part opening 20 therein. Preferably and as shown, the drive part 18 comprises a commercial nail whose shank terminates in a pointed end and is provided along its length with a multiplicity of circular ribs or burrs which serve primarily to lock said drive part to the underedge of an appropriately undersized opening provided therefor in the tubing in which it is driven, thereby to more or less securely lock said drive part to the tubing; and said ribs or burrs also serve both to secure the drive part 18 to the fastener top part 16 when said drive part is forced through the opening 20 of said latter part, and to self-secure the fastener drive part 18, and thereby the fastener as a whole, to its webbing strip end upon said drive part being forced through the usually woven fabric or plastic material making up the same. While the axial length of said drive part 18 is not critical, it will of course have sufficient length that when driven home in its tubing opening it will project a substantial distance into the interior of the tubing.

In the event it is desired to obtain a more positive holding effect between fastener and webbing-strip end than is provided solely by the circular ribs or burrs on the fastener part 18, such may be simply attained by the use of a lock washer 22 sized to be readily slipped over the end of the drive-part shank upon the latter having been forced through the webbing strip end. The provision of such a lock washer, although slightly increasing the overall cost per unit fastening, gives positive insurance against the displacement or shaking loose of a fastener from its webbing-strip end prior to the webbing strip reaching the operator who or machine which completes the fastening.

While the fastener top part 16 shown in FIG. 2–4 has plane form, it instead may have arcuate shape as indicated in FIG. 5. Moreover, from this view it will be seen that, by forming the fastener head 16a on an arc of slightly lesser radius than that of the tubing with which it is associated, its longitudinal side edges 16b and 16c are adapted to make line contact with and thereby to bear tightly on a length of webbing strip extending thereunder. To further increase their holding effect, said edges 16b, 16c may be formed with or as teeth or serrations provided, however, that such are not made sufficiently sharp as to cut through the material of the webbing strip.

Various forms of fastener drive parts as illustrated in FIGS. 6–12 inclusive may be substituted for the nail-type drive part as described in connection with FIGS. 2–4 inclusive. For example, FIG. 6 shows the shank of the drive part 18A to be provided with a plurality of (such as four) upwardly opening spurs or flukes 24 struck out from the material of the shank proper. These spurs or flukes substantially increase the diameter of the shank, which is initially slightly undersize with reference to both its hole 20 in the fastener top part 16 and its tubing hole, and they are further spaced from the under side of the drive-part head a distance slightly greater than the total thicknesses of the fastener top part 16, the under ply of webbing strip extending thereabout, and the tubing wall through which the shank extends, whereby they self-lock to the under edge of the tubing opening when their drive part is driven thereinto.

In FIG. 7, the fastener drive part 18B has the form of a split nail whose split ends are peened outwardly-upwardly so as to in effect form a pair of upwardly directed hook formations 26a, 26b. As with the aforesaid flukes 24, the hook formations 26a, 26b effectively increase the diameter of the fastener drive part so that it slightly exceeds that of its opening 20 and tubing opening, and they are moreover spaced from the under side of the drive-part head as are the flukes 24.

In the FIG. 8 form of drive part 18C, the free end of the shank is bent upwardly in the form of a side hook 28 whose lateral displacement from the shank increases the effective diameter thereof by an amount such that it is oversize with relation to its hole 20 and tubing opening as aforesaid. Also, the upper end of said hook 28 is spaced from the under side of the drive-part head a distance corresponding to the spacing of the flukes 24 of the FIG. 6 drive part.

The FIG. 9 form of drive part 18D corresponds generally to the aforesaid FIG. 8 form, except that the lower end of the shank is formed to a button-hook formation 30 but otherwise said drive part self-locks as does the FIG. 8 form to the tubing.

FIG. 10 suggests that a drive part having the general configuration of the FIG. 9 form thereof may be fashioned from wire. Thus, the drive part 18E is formed of a single length of stiff wire, one end 30a of which is coiled on itself to substantially circular head formation, and the other end 30b has button-hook formation as with the FIG. 9 drive part.

While corresponding generally to the FIGS. 6 and 7 forms of drive parts, the drive parts 18F and 18G, respectively, of the FIGS. 11 and 12 forms differ therefrom in that their shanks are formed either full-tubular or part-tubular and, in the event of being formed part-tubular, the bores thereof open through the drive-part head formation as illustrated and thereby through the fastener top part 16 (or 16A). The purpose of the aforesaid tubular construction of the drive parts will be explained hereinafter in connection with FIG. 14.

Referring to FIG. 13, such shows a completed fastening using a fastener characterized by the nail-type drive part illustrated in FIGS. 2–4, but it will be understood that any one of the different forms of drive part shown in FIGS. 6–12 inclusive may be substituted therefor with equal fastening effect.

In such a completed fastening, it will be noted that, consequent to the fastener being preliminarily attached to a webbing-strip end to be fastened at a point about an inch back from the terminal or end edge thereof, as in FIGS. 3 and 4, and to the fastener being passed through a tubing opening 40 placed to insure at least a partial wrap of webbing about the tubing 14, the free end of the webbing strip in the completed fastening forms an underlapping portion which in wrapping about the tubing engages directly against its outer peripheral surface and which is moreover pressed tight against said tubing surface by the overlapping (and also tube wrapping) webbing portion constituting the webbing strip proper, with a force which increases with the weight placed on said webbing strip. This of course produces a highly effective holding action, but such is supplemented by the further holding action exerted on the underlapping portion of the strip by the longitudinal relatively rearward edge zone of the fastener top part 16, consequent to the fastener tending to cock when weight is applied to the webbing strip as aforesaid. FIG. 13 also illustrates the self-locking action of the fastener exercised by the circular ribs or burrs on its shank part being slightly oversize with respect to the tubing hole 40 through which it is forced, as results in a slight dishing of the tubing material defining the edge of said opening, and a consequent locking of said edge with the last circular rib of the drive part to move inwardly past said opening edge so as to be fully engaged thereby, resulting from the tendency of the edge material to spring back to its original shape. The aforesaid self-locking capacity of the instant fastener is thus such as to insure a high degree of security in the finished fastening, regardless of whether the fastener strips are tensioned or have become stretched through repeated applications of weight thereto.

In addition to its great holding power and self-locking action as above, the herein fastener is notable for its inexpensive two-part construction and the facility with which the fastener parts may be assembled one with the other and with the webbing-strip end which the assembled fastener is to secure by automatic machinery capable of delivering a completed sub-assembly of webbing strip with fasteners applied to each end thereof as described, from separate fastener parts and webbing strip feeding thereinto. Accordingly, the invention is believed to make possible economies in webbing strip fastenings not possible with any of the prior fastenings with which I am familiar.

Reverting to the tubular drive parts 18F and 18G illustrated in FIGS. 11 and 12, such may be usefully employed not only to facilitate tensioning of a webbing strip in the course of being fastened at one end thereof to its spaced tubular frame part (tubing) against the other end of said webbing strip that has already been fastened to its tubing, but also as an aid to completing the fastening of said one end of the webbing strip to its tubing as will be explained.

Referring to FIG. 14, such diagrammatically illustrates a webbing strip 10 extending between two tubular side frame members 14A, 14B of a chair or like frame moving along a conveyor, such frame being usually disposed upside down so that the webbing strip is shown to be engaging against the lower quadrants of the tubing which ultimately become the upper quadrants. The view further illustrates that the securement of one (the left) end of said webbing strip to its tubing 14A is about to begin and assumes that the fastening of the other (the right) end of the webbing strip to its tubing 14B has already been completed. It will be understood that at this stage of the operation the fastener attached to said one end portion of the webbing strip about to be fastened is disposed as in FIG. 3, and hence with its head part on the face of the strip nearest the tubing and its drive part extending through the material of the webbing strip and pointed away from said tubing. In initiating the fastening, however, the operator folds both the free end portion of the webbing strip and the attached fastener upwardly-rearwardly, using the rearward side edge line of the fastener-type part as a line of fold, such resulting in the fastener being inverted and thus in its drive part now pointing generally towards its tubing 14A, as results in its bore opening through the fastener head or away from said tubing.

Making use of this fastener disposition, the operator inserts the point of a tool (which may be similar to an ice pick) into the bore of the drive part through the overlying webbing strip which may be pierced with a hole 10x, as in FIGS. 3 or 4, positioned to align with said bore opening upon folding over the free end of the webbing strip and fastener as aforesaid, or the tool may form its own opening corresponding to that designated 10x.

With the tool point now firmly anchored to the fastener consequent to its insertion into the bore of its drive part, the webbing strip end may now be tensioned against the already secured end thereof by pull applied to the tool and webbing strip end in leftwise direction. Also, by swinging the tool upwardly in an arcuate path while maintaining the webbing strip tensioned, leverage is applied to the end of the webbing being worked on, as causes said end to wrap around the tubing 14A until finally it reaches a position in which the fastener drive part is in substantial alignment with the tubing opening 40 disposed on the upper quadrant of the inverted tubing. When such alignment occurs, the tool may be employed to forcibly drive the fastener drive part into the tubing opening, thus to finally set the fastener in the tubing and thereby complete the fastening of both ends of the webbing strip to the spaced frame parts or members 14A and 14B.

Without further analysis, it will be seen that the invention achieves the objectives outlined in the early part of the specification. Of course, various changes could be made in carrying out the above constructions without departing from the scope of the invention. For example, the nail form of drive part 18 and/or the hole 20 provided therefor in the fastener head part 16 may be non-round, that is, square or rectangular or elliptical. Similarly, the tubing opening 40 need not be circular, so long as the self-locking means with which the shank of the fastener is provided, regardless of its particular form, can lockingly engage with one or more under edges thereof.

It is also to be noted that whereas the fastener head-part 16 is shown to be planar in FIGS. 2–4, for example, and upwardly convex in FIG. 5, it may also be formed with a slight upward concavity which is of advantage if zone or area rather than true line contact between the rearward edge portion of the fastener head part and the underply of the webbing strip (refer to FIG. 13) is desired to be accentuated for a particular application.

Also to be observed is that while the fastener forms illustrated are of the individual or unit type, their construction is such that they may be readily made up in strip form according to which a plurality of the fasteners are connected together in end-to-end or tandem arrangement, as disclosed in my prior application Serial No. 763,951, filed September 29, 1958, now patent No. 2,979,119, dated April 11, 1961 of which the present application is a continuation-in-part. As explained in such application, a fastener strip comprising a plurality of tandem-connected fasteners has utility in fastening one-piece fabric or plastic seat or back panels to furniture-frame tubing also adapted to the individual small-width webbing strips making up the interlaced type of seat or back and hence provided with a plurality of fastener drive-part receiving openings corresponding to that herein designated 40.

Accordingly, it is intended that all matter contained in the above description or shown in the accompanying drawings shall be interpreted as illustrative and not in a limiting sense.

I claim:

1. Tubular frame furniture construction comprising: a tubular frame member having a fastener-part receiving opening in its wall, a flexible webbing strip having an end portion arranged in doubled-over relation and extending as partial inner and outer wraps about a portion of the frame member and a T-fastener securing said doubled-over end portion to the frame member, said fastener comprising an elongated sheet-form head part having length corresponding substantially to the width of the strip and extending transversely across the strip and having elongated parallel side edges, about one of which the webbing-strip is looped so as to form its doubled-over end portion as aforesaid, and a depending headed drive part including a shank portion penetrating the inner wrap of the webbing-strip end portion and extending into said fastener-part receiving opening of the frame member and including means for self-locking itself to the inner surface of said frame member adjacent said opening when the shank is driven into said opening, said fastener head and drive parts being physically separate from one another but said head part having a hole in its central portion which is undersize with respect both to said drive-part head and to the self-locking means on said drive-part shank, whereby said fastener parts may be held together and sub-assembled to the webbing-strip end portion preliminary to initiating the fastening of the webbing-strip end portion to the tubular frame member solely in response to said drive-part being driven through the hole of the head-part following placement of the head-part in its fastening position on the webbing-strip end portion.

2. Tubular-frame furniture construction according to claim 1, wherein said drive-part comprises a nail-like member whose shank part is provided along its length with at least one outwardly projecting circular rib which is slightly oversize with respect to both said head-part hole and the frame member opening, and wherein said rib serves both as a means to hold the fastener parts and the webbing-strip end portion in sub-assembled relation as aforesaid and as the fastener-to-frame member locking means.

3. Tubular frame furniture construction according to claim 1, wherein said fastener head-part is transversely curved to the approximate curvature of said tubular frame member whereby its elongated side edges tend to press the inner wrap of the doubled-over webbing strip end portion against the outer peripheral surface of said frame member when said drive-part self-locks itself to said frame member as aforesaid, and wherein at least one of said head-part side edges is serrated and the serrations bite into the material of the webbing strip against which said serrated edge presses.

4. Tubular frame furniture construction according to claim 3, wherein both elongated side edges of the head-part are serrated as aforesaid.

5. In tubular-frame furniture construction, a sub-assembly of webbing strip and fasteners applied to the end portions thereof, ready for assembly to spaced frame members of said furniture which are provided with laterally spaced fastener-part receiving openings, comprising: a webbing strip pre-cut to the length thereof required in the final assembly, and fasteners carried by the end portions of the strip for securing same to the frame members when cooperated with the fastener-receiving openings thereof, said fasteners each comprising an elongated bar-like head-part free of said webbing strip and extending transversely of and in face engagement with a face of said strip and having length corresponding substantially to the width of said strip and being provided with a preformed hole in its central portion, and a physically separate headed drive-part having an elongated shank portion extending through said hole and piercing said webbing strip, said shank portion being provided with means which is slightly oversize with respect to the head-part hole but is capable of being forcibly projected therethrough and which is also so formed as to be effective to secure the webbing strip to the shank portion upon the latter piercing said webbing strip, whereby said means serves to secure the drive-part to the head-part of the fastener and the fastener as a whole to the webbing strip responsive to said drive-part being pushed through the head-part of the fastener disposed as aforesaid.

6. A webbing strip and fastener sub-assembly substantially as set forth in claim 5, wherein said drive-part comprises a nail-like member having at least one circular rib projecting outwardly from its shank portion, which rib provides both the head part-to-drive part and the fastener-to-webbing strip securing means.

References Cited in the file of this patent

UNITED STATES PATENTS

| | | |
|---|---|---|
| 292,333 | Lobdell | Jan. 22, 1884 |
| 643,045 | Denis | Feb. 6, 1900 |
| 861,573 | Budd | July 30, 1907 |
| 1,492,736 | Metzger | May 6, 1924 |
| 2,143,603 | Lombard | Jan. 10, 1939 |
| 2,146,592 | Poulsen | Feb. 7, 1939 |
| 2,197,590 | Place | Apr. 16, 1940 |
| 2,457,343 | Braunschweiger | Dec. 28, 1948 |
| 2,582,579 | Bedford | Jan. 15, 1952 |
| 2,832,399 | Varkala | Apr. 29, 1958 |
| 2,856,990 | Thomas | Oct. 21, 1958 |
| 2,884,994 | Rosalsky | May 5, 1959 |
| 2,937,696 | Arnold | May 24, 1960 |

FOREIGN PATENTS

| | | |
|---|---|---|
| 556,327 | Canada | Apr. 22, 1958 |